United States Patent [19]

Spehrley, Jr.

[11] 4,221,480
[45] Sep. 9, 1980

[54] BELT SUPPORT AND CONTROL SYSTEM
[75] Inventor: Charles W. Spehrley, Jr., Hanover, N.H.
[73] Assignee: Xerox Corporation, Stamford, Conn.
[21] Appl. No.: 16,251
[22] Filed: Feb. 28, 1979
[51] Int. Cl.³ .................... G03G 15/00; B65G 39/16; B65G 15/60
[52] U.S. Cl. ................................. 355/3 BE; 198/840; 198/843; 226/192
[58] Field of Search ...................... 355/3 R, 3 BE, 16; 226/192; 198/840, 843

[56] References Cited
U.S. PATENT DOCUMENTS

| | | | |
|---|---|---|---|
| 2,925,168 | 2/1960 | Lorig | 198/202 |
| 3,031,895 | 5/1962 | Kindig | 198/843 X |
| 3,050,178 | 8/1962 | Stone | 198/203 |
| 3,219,176 | 11/1965 | Kindig | 198/192 |
| 3,334,447 | 8/1967 | Leveque | 198/843 X |
| 3,643,791 | 2/1972 | Thornsbery | 198/184 |
| 3,726,588 | 4/1973 | Moser | 355/3 BE |
| 3,818,391 | 6/1974 | Jordon et al. | 355/3 BE |
| 3,961,736 | 6/1976 | Fatula | 226/192 |
| 3,980,174 | 9/1976 | Conrad | 198/835 |
| 4,150,773 | 4/1979 | Fell et al. | 226/192 X |

*Primary Examiner*—Fred L. Braun
*Attorney, Agent, or Firm*—H. M. Brownrout; C. A. Green; H. Fleischer

[57] ABSTRACT

An apparatus in which lateral movement of a moving belt is controlled so that the belt moves in a pre-determined path. The apparatus includes at least one moving member having a plurality of spaced, flexible discs extending outwardly from the exterior surface thereof. The portion or segment of the disc contacting the region of the belt passing thereover provides support therefor. Preventing the belt from deviating laterally from the pre-determined path deflects the portion or segments of the discs providing support for the belt. The deflected portion of the disc returns to the undeflected condition when not supporting the belt. In this manner, the maximum force applied to the belt never exceeds the minimum force required to buckle the belt.

16 Claims, 11 Drawing Figures

BELT SUPPORT AND CONTROL SYSTEM

This invention relates generally to an apparatus for supporting a belt arranged to move in a pre-determined path and for controlling lateral movement of the belt from the pre-determined path. An apparatus of this type is frequently employed in an electrophotographic printing machine. Where it is necessary to control the lateral movement of the belt to closely prescribed tolerances.

Generally, an electrophotographic printing machine, includes a photoconductive member which is charged to a substantially uniform potential so as to sensitize its surface. The charged portion of the photoconductive surface is exposed to a light image of an original document being reproduced. This records an electrostatic latent image on the photoconductive member corresponding to the informational areas contained within the original document being reproduced. After the electrostatic latent image is recorded on the photoconductive member, the latent image is developed by bringing a developer mix of carrier granules and toner particles into contact therewith. The toner particles are attracted from the carrier granules to the latent image forming a toner powder image on the photoconductive member. The toner powder image is then transferred from the photoconductive member to a copy sheet. Finally, the copy sheet is heated to permanently affix the toner particles thereto in image configuration. This general approach was disclosed by Carlson in U.S. Pat. No. 2,297,691, and has been further amplified and described by many related patents in the art.

It is apparent that the location of the latent image recorded on the photoconductive belt must be precisely defined in order to have the various processing stations acting thereon optimize copy quality. To this end, it is critical that the lateral alignment of the photoconductive belt be controlled within prescribed tolerances. Only in this manner will the photoconductive belt move through a pre-determined path so that the processing stations disposed thereabout will be located precisely relative to the latent image recorded thereon.

When considering control of the lateral movement of a belt, it is well known that if the belt were constructed and entrained about perfectly cylindrical rollers mounted and secured in an exactly parallel relationship with one another, there would be no lateral movement of the belt. In actual practice, however, this is not feasible. Frequently the belt velocity vector is not normal to the roller axis of rotation, or the roller is tilted relative to the plane defined by the moving belt. Under either of these circumstances, the belt will move laterally relative to the roller until it is in a kinematically stable position. Existing methods of controlling belt lateral movement comprise servo systems, crowned rollers, and flanged rollers. In any control system, it is necessary to prevent high local stresses which may result in damage to the highly sensitive photoconductive belt. Active systems, such as servo systems employing steering rollers apply less stress on the belt. However, active systems of this type are generally complex and costly. Passive systems, such as flanged rollers, are less expensive but generally produce high stresses.

Various types of flanged roller systems have hereinbefore been developed to improve the support and tracking of photoconductive belts. For example, the drive roller may have a pair of flanges secured to opposed ends thereof. If the photoconductive belt moves laterally, and engages one of the flanges, it must be capable of sliding laterally with respect to the drive roller to maintain its position. The edge force required to shift the belt laterally greatly exceeds the maximum tolerable edge force. Thus, the belt would start to buckle resulting in failure of the system. Belt edge foces are large because the drive roller has no lateral compliance. Unless the approach angle of the belt, when it contacts the drive roller, is exactly zero, forces large enough to slide the belt with respect to the drive roller are generated. Thus, a system of this type has an exceedingly short life and is not satisfactory for controlling lateral movement of a photoconductive belt in an electrophotograhic printing machine.

Alternatively the flanges may be mounted on pne of the idler rollers rather than on the drive roller. Lateral motion is controlled by bending the belt to change the approach angle to the drive roller. A system of this type develops lower edge forces when compared to having the flanges mounted on the drive roller. The primary risks associated with this system are that the performance depends significantly on the belt bending in its plane. Though reduced forces in a system of this type still appear to be unacceptable in that they also exceed the buckling force. Thus the side edge of the photoconductive belt buckles eventually reducing the life thereof.

It is, therefore, apparent that it is highly desirable to develop a flanged roller system which produces small edge forces. This may be accomplished by utilizing a roller having significant surface compliance so that lateral belt motion can be corrected by moving the belt with respect to the roller. Lateral belt motion relative to the roller surface will then be due to bending rather than slipping.

One type of system which relies on roller compliance to center the belt, but does not employ flanges is a Lorig Aligner. The Lorig Aligner is a roller which utilizes deformation of axially spaced discs or segments to achieve steering. The gap between adjacent discs is inclined at an angle with respect to the roller surface. In the Lorig roll, the gaps slant to the right on the left side of the roll and to the left on the right side of the roll so that both sides slant toward the center of the roll. Centering forces are developed which are proportional to the off-center distance of the belt and belt tension. In operation the discs are always in a state of controlled buckle. As each disc has a force applied thereon by the belt being under tension, the discs deflect toward the center. This deflection produces a centering force on the belt. The centering action of the Lorig roll is dependent on the force developed by the deflection of the discs on each side of the roll center. For a symmetrical configuration the belt is in kinematic equilibrium when the belt covers an equal number of left and right facing discs. However, the belt equilibrium position will not be at the roll center if the tension applied on the belt is not uniformly distributed across the belt width.

Significant differences exist between the Lorig roll and the present invention. The roll of the present invention has radial extending slits in each disc to de-couple portions of each disc from one another. In addition, each disc is normal to the roll longitudinal axis. In the Lorig roller, the discs are slanted relative to the roll longitudinal axis. The roller of the present invention employs a pair of opposed, spaced flanges to act as edge guides whereas the Lorig roll does not use edge guides. In operation, the roll of the present invention limits the force applied on the belt by the roller. The force exerted on the belt is limited by having portions of each disc de-coupled from one another. This enables the portion of each disc supporting the belt to bend, while the other portions, not supporting the belt, unbend returning to a normal, undeflected condition.

In accordance with the present invention there is provided an apparatus for supporting a belt arranged to move in a pre-determined path and for controlling lateral movement of the belt from the pre-determined path. The apparatus includes at least one moving member comprising a plurality of spaced, flexible fins extending ouwardly from the exterior surface thereof. The portion of the fin contacting the region of the belt passing thereover provides support therefor. One edge of each fin is spaced from the other edge thereof to define a gap therebetween. Means are provided for preventing substantial lateral movement of the belt from the pre-determined path. Preventing the belt from deviating laterally from the pre-determined path deflects that portion of the fin providing support for the belt. The deflected portion of the fin returns to the undeflected condition when not supporting the belt. This ensures that the maximum force applied to prevent belt lateral movement never exceeds the belt bucking force.

Other features of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
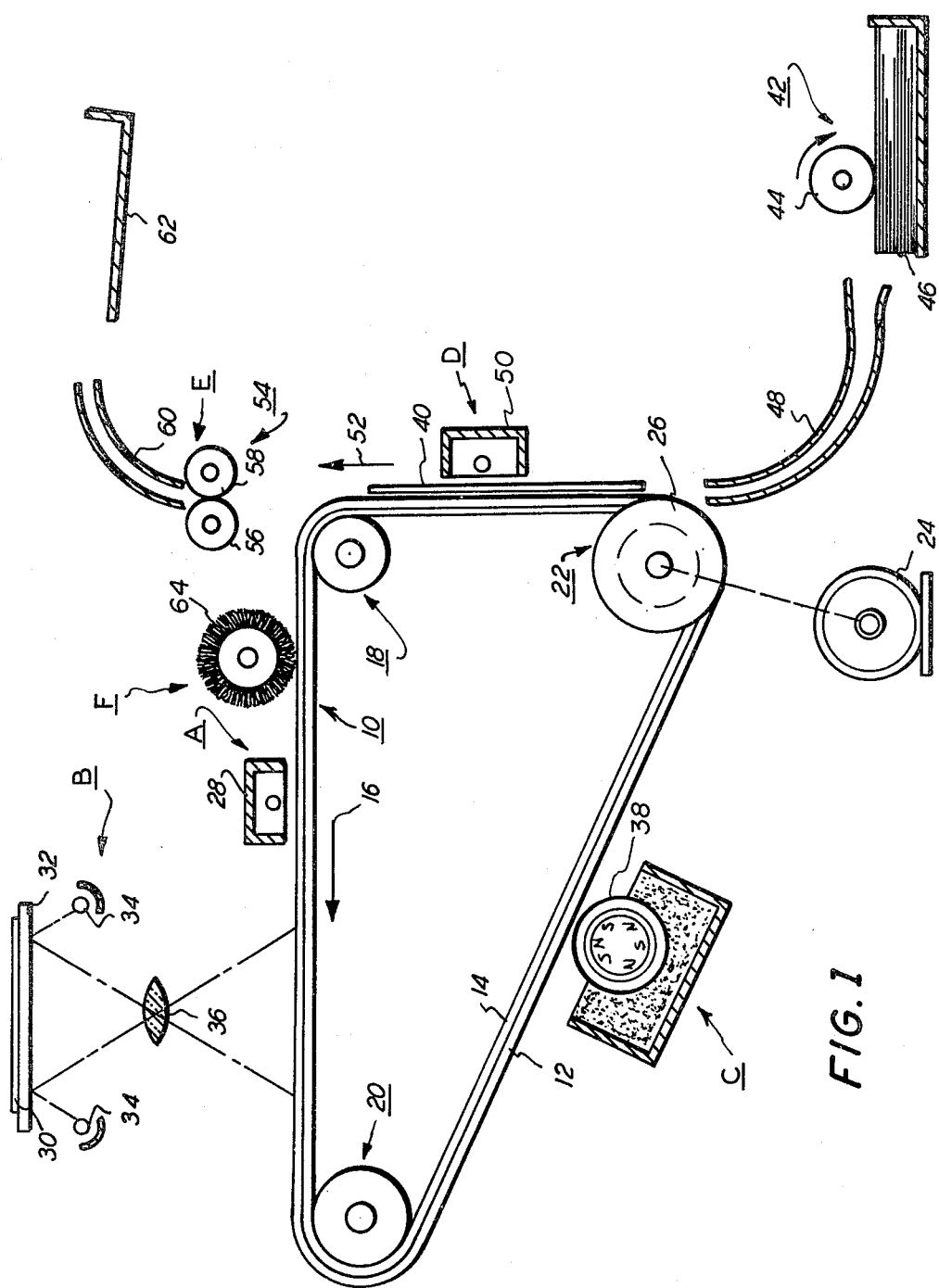
FIG. 1 is a schematic elevational view depicting an electrophotographic printing machine incorporating the elements of the present invention therein.

For a general understanding of the features of the present invention, references is had to the drawings. In the drawings, like reference numerals have been used throughout to designate identical elements. FIG. 1 schematically depicts the various components of an illustrative electrophotographic printing machine incorporating the belt support and control apparatus of the present invention therein. It will become evident from the following discussion that the belt support and control apparatus is equally well suited for use in a wide variety of devices and is not necessarily limited in its application to the particular embodiment shown herein. For example, the apparatus of the present invention may readily be employed in magnetic tape systems, motion picture camera, and motion picture projectors, amongst others.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employes a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about the path of movement thereof. Belt 10 is entrained about stripping roller 18, tension roller 20, and drive roller 22. The structure of these rollers will be described in detail hereinafter with reference to FIGS. 2(a), 2(b), 3(a), 3(b), 4(a) and 4(b).

Drive roller 22 is mounted rotatably and in engagement with belt 10. Motor 24 rotates roller 22 to advance belt 10 in the direction of arrow 16. Roller 22 is coupled to motor 24 by suitable means such as a belt drive. Drive roller 22 includes a pair of opposed, spaced flanges or edge guides 26. Edge guides 26 are mounted on opposed ends of drive roller 22 defining a space therebetween which determines the desired predetermined path of movement for belt 10. Edge guides 26 extend in an upwardly direction from the surface of roller 22. Preferably, edge guides 26 are circular members or flanges.

Belt 10 is maintained in tension by a pair of springs (not shown) resiliently urging tension roller 20 against belt 10 with the desired spring force. Both stripping roller 18 and tension roller 20 are mounted rotatably. These rollers are idlers which rotate freely as belt 10 moves in the direction of arrow 16.

With continued reference to FIG. 1, initially a portion of belt 10 passes through charging station A. At charging station A, a corona generating device, indicated generally by the reference numeral 28, charges photoconductive surface 12 of belt 10 to a relatively high, substantially uniform potential. A suitable corona generating device is described in U.S. Pat. No. 2,836,725 issued to Vyberberg in 1958.

Next, the charged portion of photoconductive surface 12 is advanced through exposure station B. At exposure station B, an original document 30 is positioned face down upon transparent platen 32. Lamps 34 flash light rays onto original document 30. The light rays reflected from original document 30 are transmitted through lens 36 forming a light image thereof. The light image is projected onto the charged portion of photoconductive surface 12 to selectively dissipate the charge thereon. This records an electrostatic latent image on photoconductive surface 12 which corresponds to the informational area contained within original document 30.

Thereafter, belt 10 advances the electrostatic latent image recorded on photoconductive surface 12 to development station C. At development station C, a magnetic brush developer roller 38 advances a developer mix into contact with the electrostatic latent image. The latent image attracts the toner particles from the carrier granules forming a toner powder image photoconductive surface 12 of belt 10.

Belt 10 then advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roll 44 contacting the upper sheet of stack 46. Feed roll 44 rotates so as to advance the uppermost sheet from stack 46 into chute 48. Chute 48 directs the advancing sheet of support material into contact with the photoconductive surface 12 of belt 10 in a timed sequence so that the toner powder image developed thereon contacts the advancing sheet of support material at transfer station D.

Transfer station D includes a corona generating device 50 which sprays ions onto the backside of sheet 40. This attracts the toner powder image from photoconductive surface 12 to sheet 40. After transfer, the sheet continues to move in the direction of arrow 52 onto a conveyor (not shown) which advances the sheet to fusing station E.

Fusing station E includes a fuser assembly, indicated generally by the reference numeral 54, which permanently affixes the transferred toner powder image to sheet 40. Preferably, fuser assembly 54 includes a heated fuser roller 56 and a back-up roller 58. Sheet 40 passes between fuser roller 56 and back-up roller 58 with the toner powder image contacting fuser roller 56. In this manner, the toner powder image is permanently affixed to sheet 40. After fusing, chute 60 guides the advancing sheet 40 to catch tray 62 for removal from the printing machine by the operator.

Invariably after sheet of support material is separated from photoconductive surface 12 of belt 10, some residual particles remain adhering thereto. These residual particles are removed from photoconductive surface 12 at cleaning station F. Cleaning station F includes a rotatably mounted fiberous brush 64 in contact with photoconductive surface 12. The particles are cleaned from photoconductive surface 12 by the rotation of brush 64 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine.

Figure 2A:
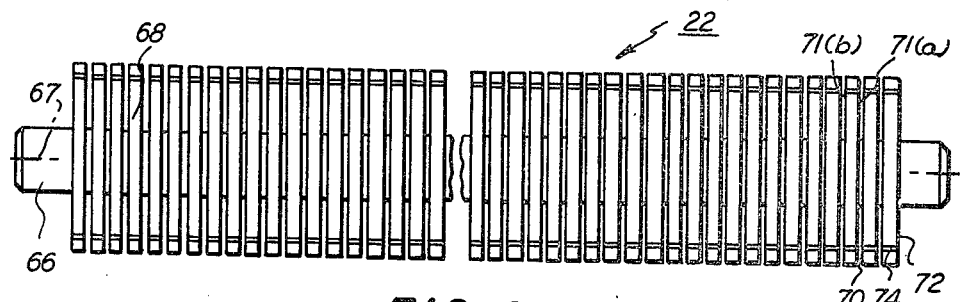
FIG. 2(a) is an elevational view illustrating the drive roller employed in the belt support system of the FIG. 1 printing machine.
Figure 2B:
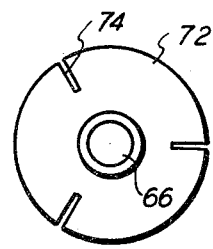
FIG. 2(b) is an elevational view showing a disc of the FIG. 2(a) driver roller.

Referring now to the specific subject matter of the present invention, FIG. 2(a) depicts drive roller 22 in greater detail. Drive roller 22 includes a substantial rigid shaft 66 having a readily deformable cylinder 68 secured thereon. Cylinder 68 has a plurality of slits 70 extending from the exterior circumferential surface thereof to a diameter slightly greater than the diameter of shaft 66. This defines a plurality of axially spaced rings or discs 72 extending along the longitudinal axis of cylinder 68. As shown in FIG. 2(b), each disc 72 has three equally spaced slits 74 therein. Slits 74 extend radially inwardly from the exterior surface of disc 72. The slits 74 of each disc 72 are co-linear with one another defining three longitudinally extending grooves. Each groove is substantially parallel to the longitudinal axis 62 of shaft 66. Preferably, shaft 66 is made from stainless steel with cylinder 68 being made from polyurethane. Each disc 72 has a thickness of about 0.3 cm. with the space 70 between adjacent discs 72 being about 0.1 cm. Opposed planar surfaces 71(a) and 71(b) of disc 72 are substantially parallel to one another and substantially normal to the longitudinal axis 67 of shaft 66. Longitudinal axis 67 of shaft 66 is in substantial coincidence with the longitudinal axis of cylinder 68. The spaces 70 between each disc 72 are substantially equal to one another. Each slit 74 is preferably about 0.1 cm. wide and about 1.0 cm. deep, i.e. slit 74 extends about 1.0 cm. radially inwardly from the circumferential surface of disc 72. Each disc 72 is a radially outwardly extending fin having a height of about 1.0 cm. The height of each fin is equal to the depth of each slit 74. In this way, each fin is divided into three equal portions or segments with each portion being essentially de-coupled from one another, i.e. the bending and deflecting of one portion has little or no effect on the other portions. Each fin has a height to thickness ratio of about 3.3. Thus, each fin is flexible and bends in a manner similar to that of a cantilever beam.

Figure 3B:
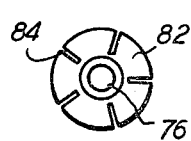
FIG. 3(b) is an elevational view illustrating a disc of the FIG. 3(a) stripper roller.
Figure 3A:
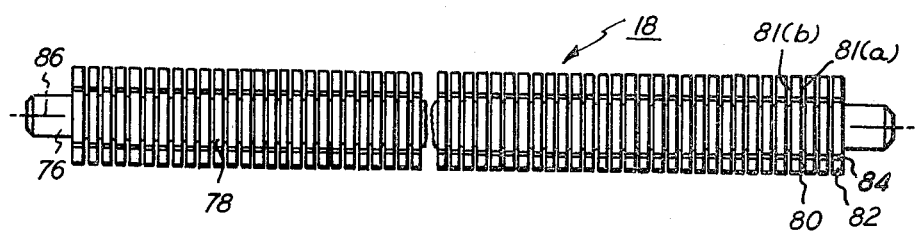
FIG. 3(a) is an elevational view depicting the stripper roller employed in the belt support system of the FIG. 1 printing machine.

Turning now to FIG. 3(a), stripping roller 18 is shown thereat in greater detail. Stripping roller 18 includes a substantially rigid shaft 76 having a readily deformable cylinder 78 secured thereon. Cylinder 78 has a plurality of axially spaced slits 80. These slits extend from the exterior circumferential surface radially inwardly to a diameter slightly greater than that of shaft 76. This defines a plurality of axially spaced rings or discs 82 extending along the longitudinal axis of cylinder 78. Each disc 82 is relatively thin and has a height to thickness ratio such that it will act as a thin fin and bend in a manner similar to a cantilever beam when a load is placed on the exterior circumferential surface thereof. As shown in FIG. 3(b) each disc 82 includes five equally spaced slits 84. Each slit 84 extends radially inwardly from the exterior circumferential surface of disc 82. Slits 84 of each disc 82 are co-linear with one another defining five longitudinally extending grooves. Each groove is substantially parallel to the longitudinal axis 86 of shaft 76. Preferably, shaft 76 is made from stainless steel with cylinder 78 being made from polyurethane. Each disc 82 has a thickness of about 0.2 cm. with the space 80 between adjacent discs 82 being about 0.15 cm.. Opposed planar surfaces 81(a) and 81(b) of discs 82 are substantially normal to the longitudinal axis 86 of shaft 76. Longitudinal axis 86 is in substantial coincidence with the longitudinal axis of cylinder 78. The spaces 80 between each disc 82 are substantially equal to one another. Each of the slits 84 is preferably about 0.15 cm. wide and about 0.5 cm. deep, i.e. each slit 84 extends about 0.5 cm. radially inwardly from the circumferential surface of disc 82. Each disc 82 acts as a radially outwardly extending fin having a height of about 0.5 cm.. The height of each fin is equal to the depth of each slit 84. In this manner, each fin is divided into five equal portions with each portion being essentially de-coupled from one another, i.e. the bending or deflection of one portion has little or no effect on the other portions. Each fin has a height to thickness ratio of about 2.5.

Figure 4B:
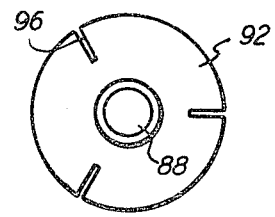
FIG. 4(b) is an elevational view depicting a disc of the FIG. 4(a) tension roller.
Figure 4A:
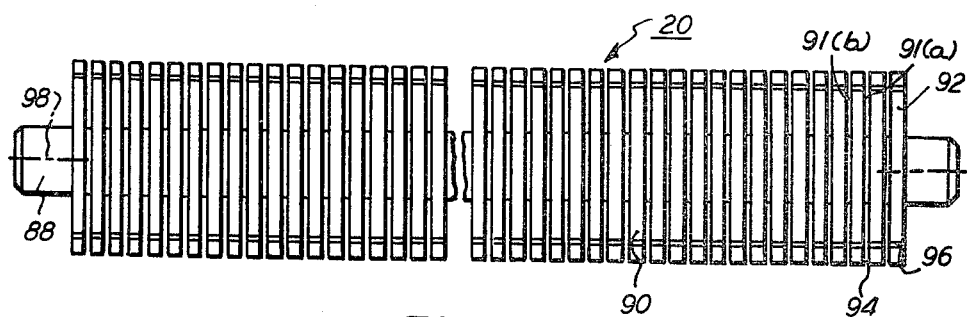
FIG. 4(a) is an elevational view showing the tension roller employed in the FIG. 1 printing machine.

Referring now to FIG. 4(a), there is shown the detailed structure of tension roller 20. As shown thereat, tension roller 20 includes a substantially rigid shaft 88 having a readily deformable cylinder 90 secured thereto. Cylinder 90 includes a plurality of axially spaced slits 94 extending radially inwardly from the exterior circumferential surface thereof to a diameter slightly greater than that of shaft 88 to define a plurality of axially spaced rings or discs 92. Each disc 92 is relatively thin and bends in a manner similar to that of a cantilever beam. As shown in FIG. 4(b), disc 92 has three equally spaced slits 96 extending radially inwardly from the exterior circumferential surface thereof to a diameter slightly greater than that of shaft 88. The slits 96 in each disc 92 are co-linear with one another. In this manner, three equally spaced longitudinally extending grooves are formed. The grooves extend substantially parallel to axis 98 of shaft 88. Preferably, shaft 88 is made from stainless steel with cylinder 90 being made from polyurethane. Each disc 92 has a thickness of about 0.3 cm. with the space 94 between adjacent discs 92 being about 0.1 cm. Opposed planar surface 91(a) and 91(b) of discs 92 are substantially parallel to one another and substantially normal to the longitudinal axis 98 of shaft 88. Longitudinal axis 98 of shaft 88 is in substantial coincidence with the longitudinal axis of cylinder 90. Spaces 94 between each disc 92 are substantially equal to one another. Each slit 96 is about 0.1 cm. wide and about 1.0 cm. deep, i.e. each slit 96 extends about 1.0 cm. radially inwardly from the circumferential surface of disc 92. Each disc 92 may be considered to be a radially outwardly extending fin having a height of about 1.0 c.m.. The height of each fin is equal to the depth of each slit 96. In this manner, each fin is divided into three equal portions with each portion being essentially decoupled from one another, i.e. the bending or deflection of one portion has little or no effect on the other portions. Each fin has a height to thickness ratio of about 3.3.

Figure 5A:
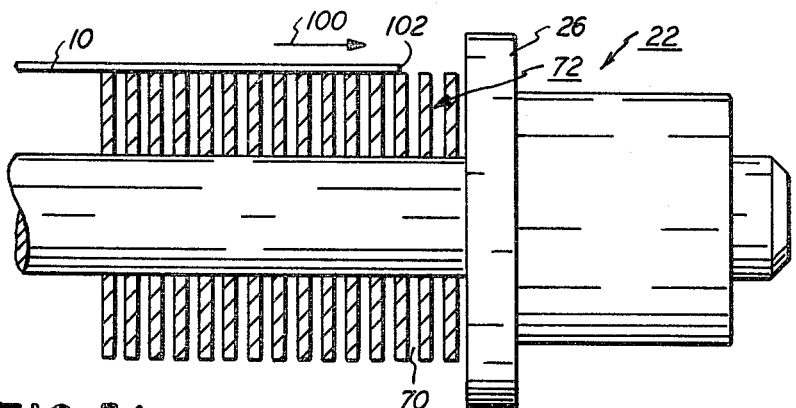
FIG. 5(a) is an enlarged fragmentary, schematic elevational view showing the belt moving laterally along the FIG. 2(a) drive roller.
Figure 5B:
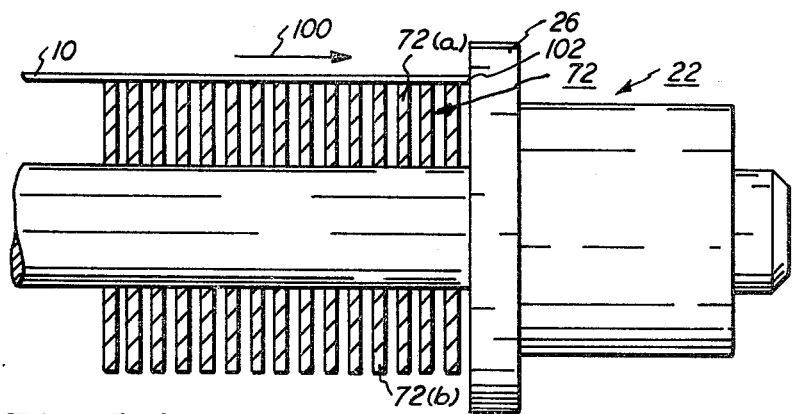
FIG. 5(b) is an enlarged, fragmentary schematic elevational view depicting the belt contacting an edge guide of the FIG. 2(a) drive roller.
Figure 5C:
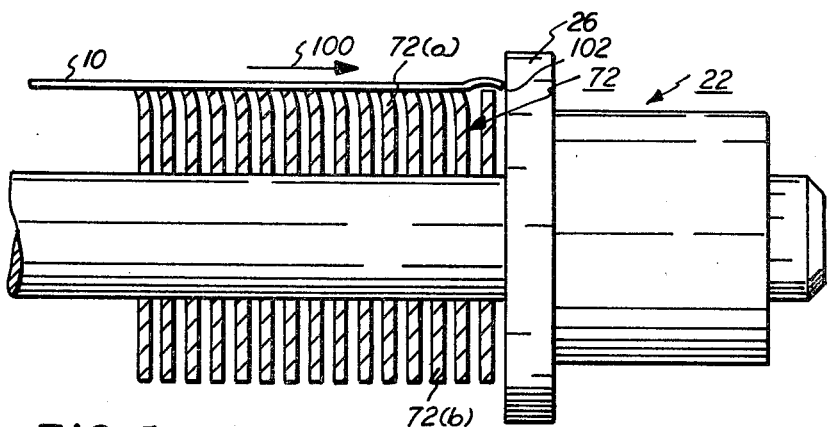
FIG. 5(c) is an enlarged, fragmentary schematic elevational view illustrating the FIG. 2(a) driver roller discs deflecting.

Referring now to FIGS. 5(a) through 5(c), inclusive, the manner in which drive roller 22 prevents lateral movement of belt 10 will be described. While only the operation of drive roller 22 will be described, one skilled in the art will appreciate that tension roller 20 and stripping roller 18 operate in a substantial identical manner.

Turning now to FIG. 5(a), belt 10 is shown moving laterally in the direction of arrow 100 across drive roller 22. A portion of each disc 72 supports belt 10. Edge guide 26 defines the maximum permissable lateral movement of belt 10 in the direction of arrow 100. As belt 10 continues to move in the direction of arrow 100, belt edge 102 engages edge guide 26.

FIG. 5(b) shows edge 102 of belt 10 contacting edge guide 26. Belt 10 is wrapped around discs 72. The circumferential portion of discs 72 contacting belt 10 are determined by the length of belt wrapped about roller 22, i.e. the wrap angle. As shown, portions 72(a) of disc 72 support belt 10 while portions 72(b) are spaced therefrom. Portions 72(b) of disc 72 are separated from portion 72(a) by slits 74 (FIG. 2(b)). Thus, portion 72(b) is substantially de-coupled from portion 72(a) of disc 72. The de-coupling of one portion of disc 72 from other portions thereof is highly significant in controlling the maximum force applied to edge 102 of belt 10 by edge guide 26.

Turning now to FIG. 5(c), as belt 10 continues to move in the direction of arrow 100, a bend forms in the side marginal region of belt 10. As belt 102 bends, portion 72(a) of disc 72 deflect or bend in a manner similar to that of a cantilever beam. However, portion 72(b) remains substantially undeflected inasmuch as belt 10 is not in contact therewith and the edge force is not transmitted thereto. As drive roller 22 continues to rotate portions 72(a) move away from belt 10 and portions 72(b) move into contact therewith. As portions 72(a) move away from contacting belt 10, they return to their undeflected position. As portions 72(b) move into contact with belt 10 they, in turn, are deflected. Thus, it is seen that each portion of disc 72 supporting belt 10 bends as edge guide 26 applies an edge force thereon. Each disc is relatively stiff in the circumferential direction and radial directions but are laterally compliant. The basic action is that the portions of each disc containing belt 10 bend in response to the edge force, and the bending of these portions allows the belt to move relative to the roller. As the portion of the disc supporting the belt moves or rotates away from the belt, the bending force is removed therefrom and that portion of the disc no longer supporting the belt returns to its undeflected position. Only by de-coupling portions of each disc from one another will the foregoing occur. The various portions of each disc are de-coupled from one another by the slits extending in a radial direction. The discs are designed to be sufficiently compliant to limit the maximum edge force to a value beneath that required to cause the side edge of the belt to buckle.

The edge force applied on belt 10 is equal to the sum of the forces produced by the deflection of the discs of each roller. The maximum edge force (F) applied on belt 10 may be expressed as:

$$F = f \times K \times LTR \times WL$$

where:

f is a factor to correct the theoretical equation to that of test measurements;

K is the spring rate of each roller which is the lateral spring rate of all of the discs of each roller;

LTR is the lateral tracking rate and corresponds to the lateral distance that the belt moves per distance moved along the pre-determined path; and WL is the wrap length, i.e. the length of belt wrapped around the roller, wrap length is proportional to the angle of wrap of the belt about the roller.

Figure 6:
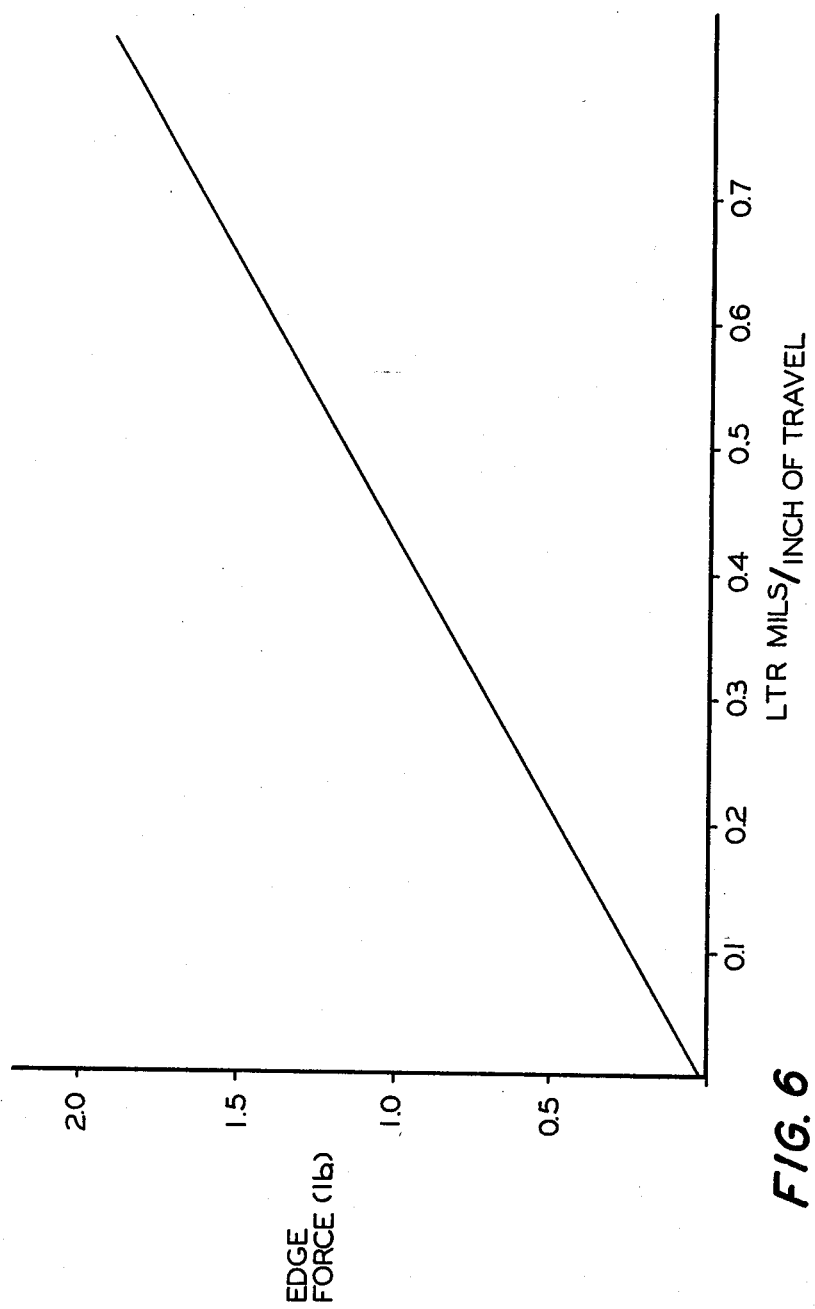
FIG. 6 is a graph showing the total edge force as a function of the belt lateral tracking rate.

A graph plotting the change in edge force as a function of lateral tracking rate is shown in FIG. 6. The maximum edge force is less than the critical buckling force of belt 10.

It is evident that belt 10 is stably constrained at a lateral location which is not in kinematic equilibrium. This is achieved by permitting a portion of each disc to bend laterally for a portion of each roller revolution. Thereafter, the deflected portion of each disc returns to the undeflected or free position so as to prevent a continuous build up of edge forces which would eventually exceed the buckling force of the belt.

Referring once again to FIG. 1, only drive roller 22 is shown as having edge guides 26. One skilled in the art will appreciate that stripping roller 18 and tension roller 20 may also have edge guides. This system will operate satisfactorily with one, two or three pair of edge guides. The total edge force exerted on the belt will be substantially the same in any of the foregoing cases.

It has been found that rollers 18, 20, and 22 may be readily manufactured. Preferably, the rollers are made by molding a block of polyurethane onto a stainless steel shaft. The outer diameter of the polyurethane is then ground to the desired dimension. Thereafter, the rolls are slit both radially and longitudinally. In this way, the plurality of spaced radial slits define a plurality of axially spaced discs. The plurality of longitudinally extending slits de-couple portions of each disc from one another. This permits the portion of the disc supporting the belt to deflect while the portion of the disc spaced from the belt remains undeflected. It is this foregoing manner of operation which is assures that the maximum edge force never approaches that required to buckle the belt.

It is, therefore, evident that there has been provided in accordance with the present invention an apparatus for supporting a belt and controlling lateral movement thereof. This apparatus fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An apparatus for supporting a belt arranged to move in a pre-determined path and for controlling lateral movement of the belt from the predetermined path, including:
   at least one rotatably mounted roller comprising a plurality of spaced, flexible discs extending outwardly from the exterior surface of said roller, each of said discs having a plurality of slits therein with each slit defining a space between one edge of said disc and the other edge thereof with the slits in adjacent discs being substantially co-linear with one another to define a plurality of spaced, longitudinally extending grooves which de-couples segments of each of said discs from one another so that at least one segment of each of said plurality of discs contacts the region of the belt passing thereover to provide support therefor; and
   means for preventing substantial lateral movement of the belt from the pre-determined path with the segment of each of said plurality of discs supporting the belt being deflected and returning to a substantially undeflected condition when not supporting the belt.

2. An apparatus as recited in claim 1, wherein said preventing means applies a force on the belt to prevent substantial lateral movement of the belt from the pre-determined path.

3. An apparatus as recited in claim 2, wherein the force on the belt is about equal to the combined force exerted on the belt by the segment of each of said plurality of discs being deflected.

4. An apparatus as recited in claim 3, wherein said plurality of discs have a combined spring constant such that the combined force exerted on the belt by the segment of each of said plurality of discs being deflected is less than the minimum force required to buckle the belt.

5. An apparatus as recited in claim 1, wherein the spacing between each of said discs is substantially equal.

6. An apparatus as recited in claim 5, wherein opposed, planar surfaces of said plurality of discs are substantially parallel to one another.

7. An apparatus as recited in claims 1, 2, 3, 4, 5, or 6, wherein said preventing means includes a pair of opposed spaced flanges, one of said pair of flanges being mounted on one end portion of said roller and the other of said pair of flanges being mounted on the other end portion thereof, said pair of flanges extendng outwardly from the circumferential surface of said roller.

8. An apparatus as recited in claim 7, wherein each flange of said pair of flanges is a substantially circular member.

9. An electrophotographic printing machine of the type having an endless photoconductive belt arranged to move in a pre-determined path, wherein the improved apparatus for supporting the photoconductive belt and controlling lateral movement of the photoconductive belt from the pre-determined path includes:
   at least one rotatably mounted roller comprising a plurality of spaced, flexible discs extending outwardly from the exterior surface of said roller, each of said discs having a plurality of slits therein with each slit defining a space between one edge of said disc and the other edge thereof with the slits in adjacent discs being substantially co-linear with one another to define a plurality of spaced, longitudinally extending grooves which de-couple segments of each of said discs from one another so that at least one segment of each of said plurality of discs contacts the region of the photoconductive belt passing thereover to provide support therefor; and
   means for preventing substantial lateral movement of the photoconductive belt from the pre-determined path with the segment of each of said plurality of discs supporting the photoconductive belt being deflected and returning to a substantially undeflected condition when not supporting the photoconductive belt.

10. A printing machine as recited in claim 9 wherein said preventing means applies a force on the photoconductive belt to prevent substantial lateral movement of the photoconductive belt from the pre-determined path.

11. A printing machine as recited in claim 10, wherein the force applied on the photoconductive belt is about equal to the combined force exerted on the photoconductive belt by the segment of each of said plurality of discs being deflected.

12. A printing machine as recited in claim 11, wherein said plurality of discs have a combined spring constant such that the combined force exerted on the photoconductive belt by the segment of each of said plurality of discs being deflected is less than the minimum force required to buckle the photoconductive belt.

13. A printing machine as recited in claim 9, wherein the spacing between each of said discs is substantially equal.

14. A printing machine as recited in claim 13, wherein opposed planar surfaces of said plurality of discs are substantially parallel to one another.

15. A printing machine as recited in claims 9, 10, 11, 12, 13 or 14, wherein said preventing means includes a pair of opposed, spaced flanges, one of said pair of flanges being mounted on one end portion of said roller and the other of said pair of flanges being mounted on the other end portion thereof, said pair of flanges extending outwardly from the circumferential surface of said roller.

16. A printing machine as recited in claim 15, wherein each flange of said pair of flanges is a substantially circular member.

* * * * *